(12) United States Patent
Ayer, III

(10) Patent No.: US 12,193,433 B2
(45) Date of Patent: Jan. 14, 2025

(54) EXTERNAL REED CALL

(71) Applicant: Slayer Duck Calls, LLC, Eagle, ID (US)

(72) Inventor: Willaim L. Ayer, III, Eagle, ID (US)

(*) Notice: Subject to any disclaimer, the term of this patent is extended or adjusted under 35 U.S.C. 154(b) by 3 days.

(21) Appl. No.: 18/449,577

(22) Filed: Aug. 14, 2023

(65) Prior Publication Data

US 2024/0081316 A1 Mar. 14, 2024

Related U.S. Application Data

(60) Provisional application No. 63/374,618, filed on Sep. 6, 2022.

(51) Int. Cl.
*A01M 31/00* (2006.01)

(52) U.S. Cl.
CPC .................................. *A01M 31/004* (2013.01)

(58) Field of Classification Search
CPC .................................................. A01M 31/004
See application file for complete search history.

(56) References Cited

U.S. PATENT DOCUMENTS

| | | | | |
|---|---|---|---|---|
| 3,579,903 | A * | 5/1971 | Stewart | A01M 31/004 446/208 |
| 5,975,978 | A * | 11/1999 | Hall | A01M 31/004 446/209 |
| 7,083,492 | B1 * | 8/2006 | Morocco | A01M 31/004 446/202 |

* cited by examiner

*Primary Examiner* — Richard G Davis
(74) *Attorney, Agent, or Firm* — Scott D. Swanson; Shaver & Swanson, LLP

(57) ABSTRACT

An external game call having a housing through which air is blown. The housing has a reed having an elastomeric material, typically latex, stretched between two arms of the reed frame. The reed is mounted in the housing such that airflow travels across the reed causing the latex to resonate, generating sounds that mimic game animals such as elk. The housing has an actuator that is depressed to position an actuator tongue onto the reed, and to exert variable pressure on the reed based on pressure applied by the user on the button. The actuator tongue is configured in structure to simulate a human tongue, thus producing life like sounds typically achieved by the use of internal reeds.

17 Claims, 14 Drawing Sheets

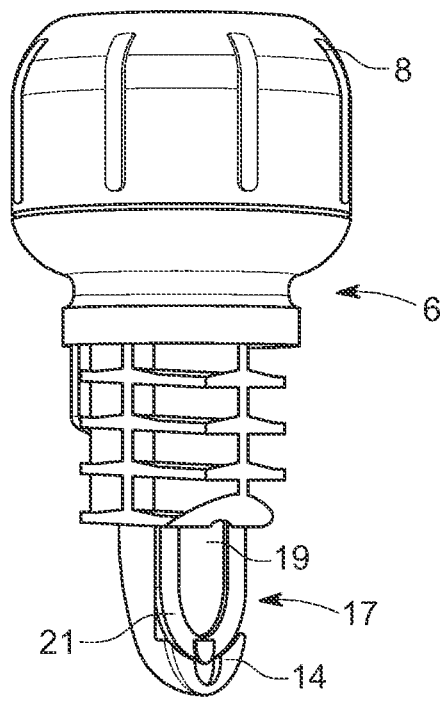
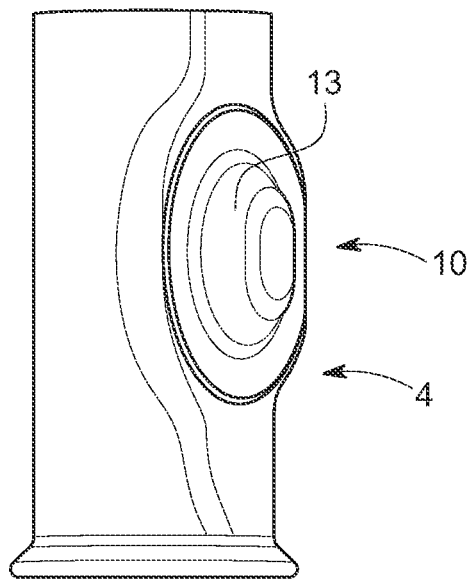
FIG. 1.1

Fig. 4
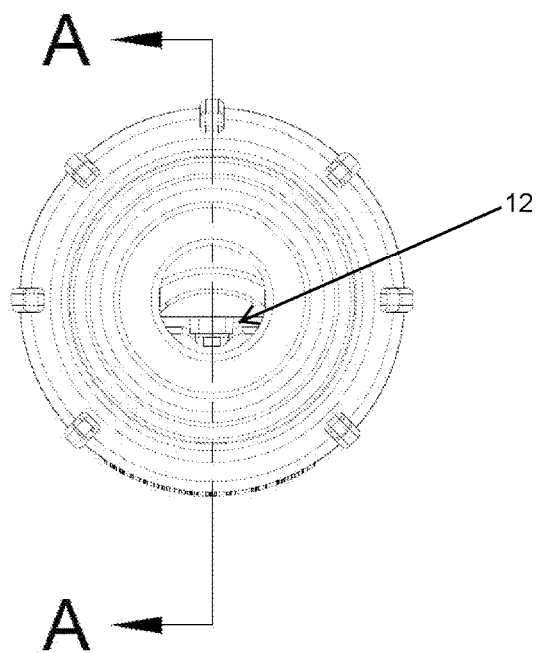
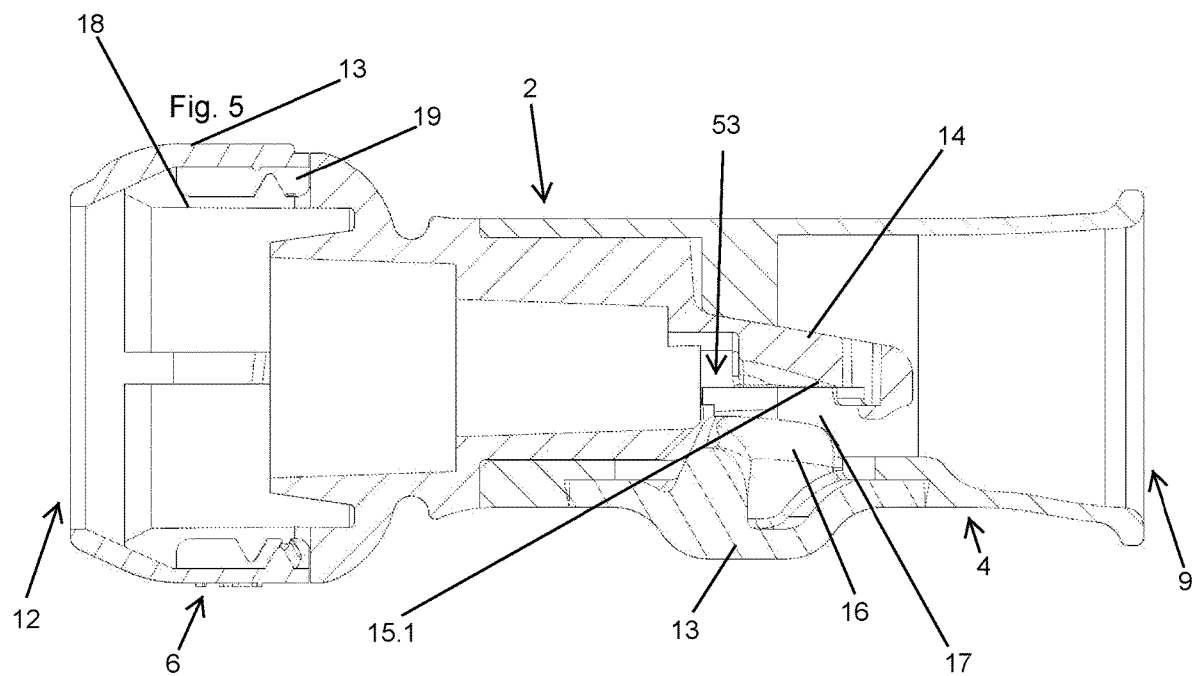
Fig. 5

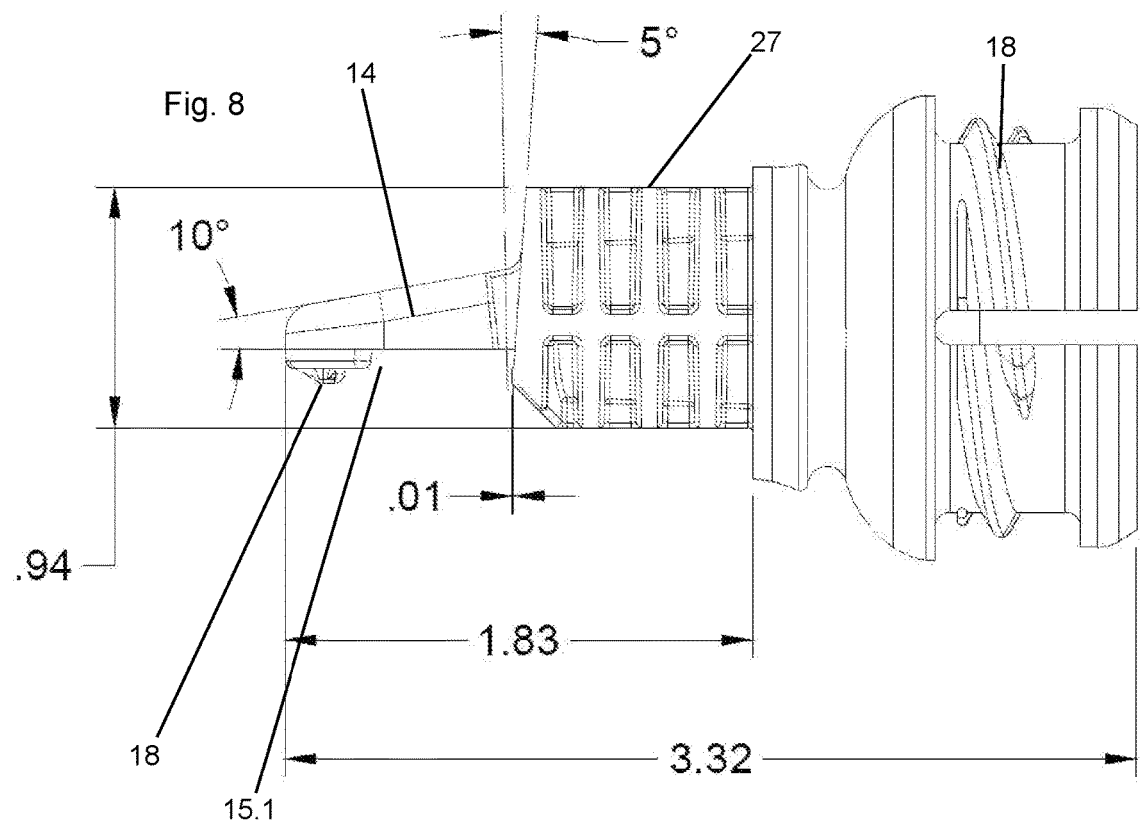
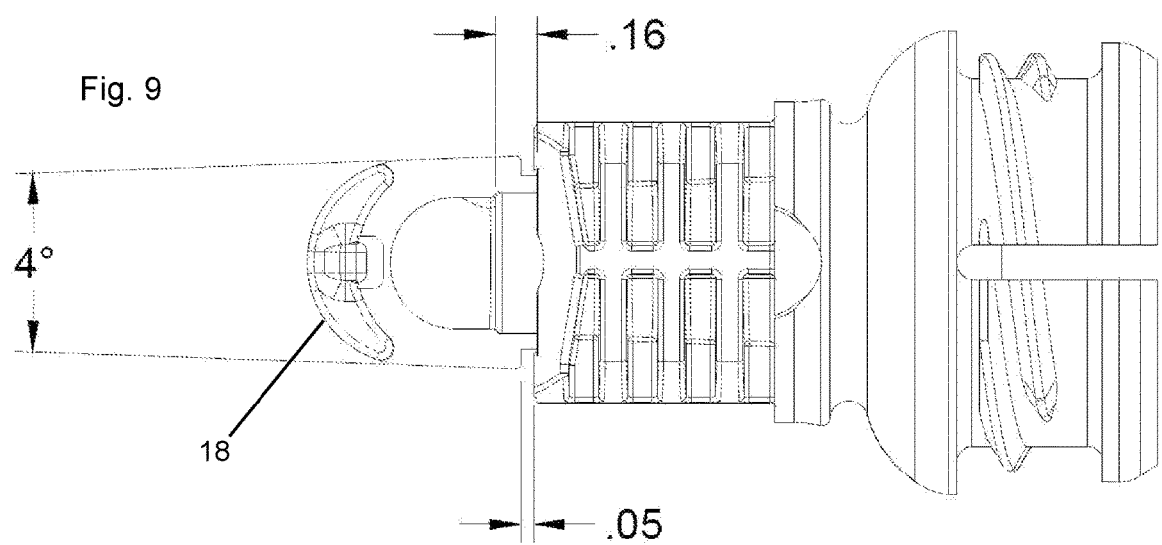

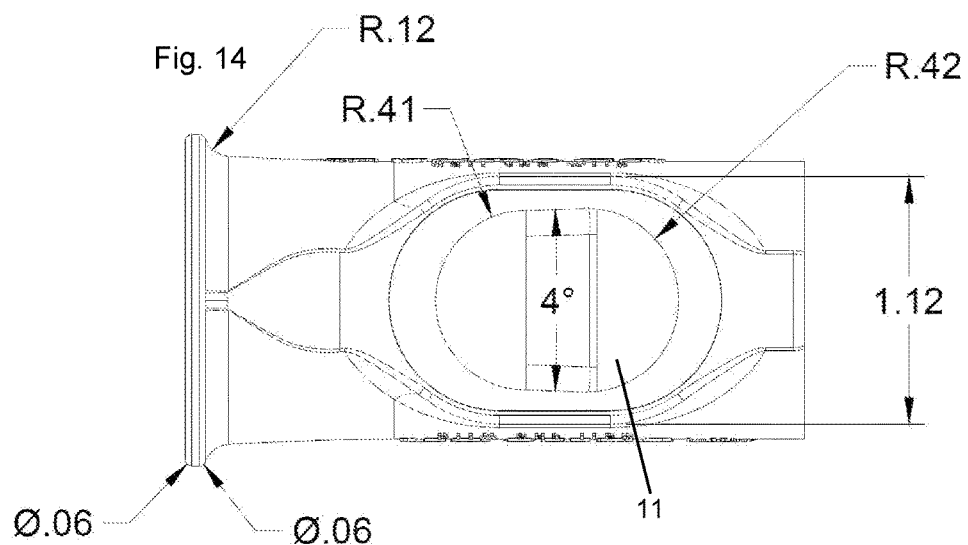
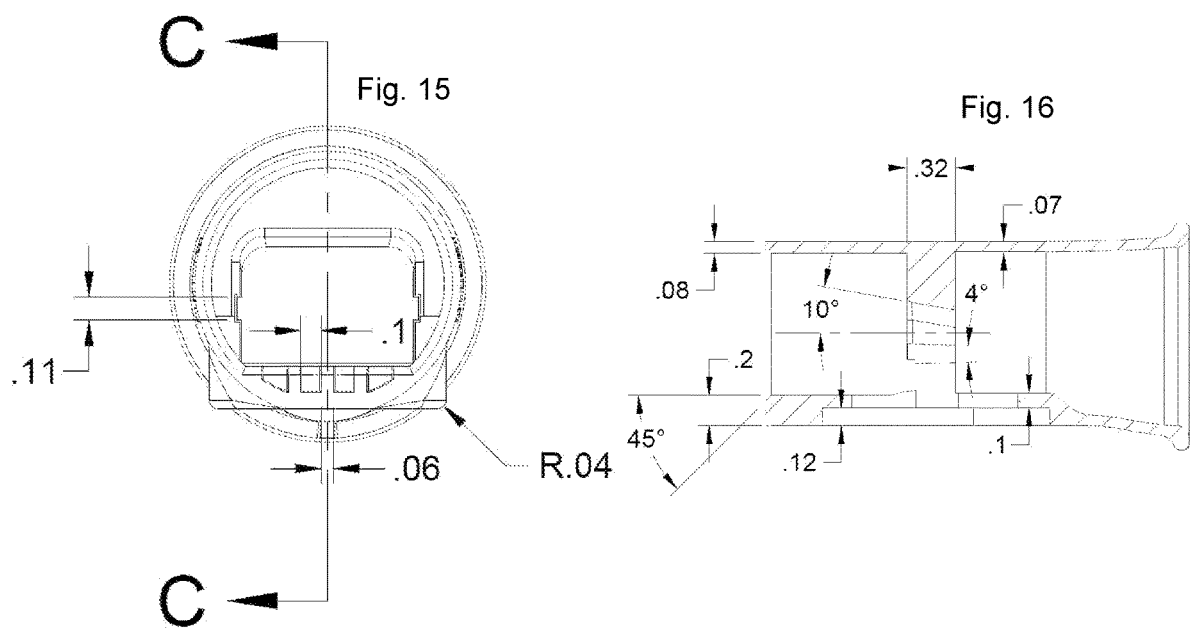

EXTERNAL REED CALL

PRIORITY/CROSS-REFERENCE TO RELATED APPLICATIONS

This application claims the benefit of U.S. Provisional Application No. 63/374,618, filed Sep. 6, 2022, the disclosure of which is incorporated by reference.

TECHNICAL FIELD

The disclosure generally relates to the field of an improved game call. Particular embodiments relate to an improved external reed call configured to more accurately simulate the operation of an internal reed call within an operator's mouth.

SUMMARY

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

BACKGROUND

Hunters and wildlife watchers often use a call that mimics the sound made by an animal. One popular type of call is a reed call. With a reed call the user blows or pushes air across a reed causing the reed to vibrate and imitate sound. There are two types of reed that are often used: the first is an internal reed call and the second is an external reed call. With an internal reed, the user positions the reed within the user's mouth against the roof of the user's mouth and utilizes the user's tongue to manipulate the flow of air across the reed. With an external reed call, the reed is positioned within an external call and the user blows air into the call to cause the reed to make a sound.

Typically, internal reed calls produce much more realistic sounds, specifically with elk calling. Elk produce a sound that is easily mimicked with an internal call. Some people are unable to use an internal call. With elk, the user typically utilizes a reed call to mimic the sounds of cow or calf elf and typically utilized an elongated tube to simulate the sounds of a bull (or male) elk. However external calls have had difficulty in precisely or realistically mimicking the sound of an elk. Accordingly, what is needed is an improved external call that more realistically simulates the sounds of an elk.

SUMMARY

What is disclosed is an improved external reed elk or other game call that has an actuator configured to simulate a human tongue applying pressure to the reed of the call. The tongue actuator in combination with the inner chamber(s) of the call allow the call to remarkably mimic the typically more natural sounds produced by an internal reed (meaning a reed positioned in the mouth of a person).

What is disclosed is an external reed game call. The call has a housing having a housing wall and defining an inflow orifice and an outflow orifice. The call is configured for airflow blown into the inflow orifice and out the outflow orifice through a lumen of the housing. The lumen defines an airflow path that restricts airflow and directs the airflow across a reed.

The reed is positioned in the housing between the inflow orifice and outflow orifice. The reed having a first end and a second end. Preferably the reed is U-shaped with the arms of the U extending to the second end of the reed. The second end of the reed having an elastomeric membrane stretched between two arms of a reed frame. Preferably the elastomeric membrane is latex. The reed is mounted in the lumen such that airflow from the inflow orifice flows across the reed from the first end of the reed toward the second end of the reed.

An actuator extends through the housing wall and is configured to apply pressure to the reed to alter the sounds emitted by the call. The actuator serves as button positioned on an external side of the housing. The has an actuator tongue extending in an opposite direction from the actuator button into the lumen of the housing. The actuator button is configured to move the actuator tongue into contact with the reed and to apply variable pressure to the reed as variable pressure is applied to the actuator button. The actuator tongue has two lobes extending away from the button, wherein the lobes extending longitudinally in the lumen along the airflow path. The lobes are configured to simulate the shape of a human tongue when used to operate an internal reed call. These lobes extend generally parallel to one another, with each of the lobes comprises a narrower end and a wider end configured. In a preferred embodiment the actuator comprises an actuator disc positioned within an opening in the actuator housing. In this embodiment the button extends from a top surface of the actuator disc, and the actuator tongue extends from a bottom surface of the actuator disc The reed is typically mounted on a frame that extends into the lumen. In a preferred embodiment the housing of the call is in two parts, a reed support housing and an actuator housing. The reed is preferably removably mounted on the reed support frame to allow for changing or replacement of the reed.

Preferably the outflow end of the call is configured for attachment to an elk bugle, or bellow. This is preferably done by a compression ring, including a threaded ring configured for attaching the reed support housing to a bugle tube.

The actuator tongue is configured so as to apply pressure similar to a human tongue. In a preferred embodiment the actuator tongue has two opposing lobes that each extend generally parallel to the length of the chamber housing. In a preferred embodiment, the actuator is configured to insert into the opening in the housing. In a preferred embodiment, the two lobes are generally sloped toward one another and extend from a front face that forms a generally planer face having a crevasse that extends between the two lobes. In a preferred embodiment, this faces form an approximately one hundred fifteen degree angle from a top portion of the insert plate. In a preferred embodiment, the actuator tongue extends 0.27 inches above the top surface of the plate. On the opposing side of the plate, the button preferably extends approximately ⅓ of an inch from the top surface of the actuator plate. The two opposing lobes are generally sloped away from the front face. A depression or crevice extends between the two lobes, extending toward the top surface of the actuator plate.

The external reed call is configured for attachment to a bugle tube. A bugle tube is well-known in the elk calling industry as being an elongated plastic tube for use in simulating the sounds of an elk bugling. A bugle tube provides an extended resonance chamber in which the sounds of the external reed call are amplified to provide an elk bugle sound.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

BRIEF DESCRIPTION OF THE FIGURES

FIG. 1.1 is a partially exploded view of the embodiment of an external reed call shown in FIG. 1.

FIG. 4 is an isometric view of the external reed call of FIG. 1 looking into opening 12 of FIG. 1.

FIG. 5 is a section view along section line A of FIG. 4.

FIG. 8 is a side isometric view of the reed support housing of FIG. 6.

FIG. 9 is a top isometric view of the reed support housing of FIG. 6 showing a clip or tab for attaching a reed.

FIG. 14 is top isometric view of the actuator housing of FIG. 1.

FIG. 15 is an isometric view of the actuator housing looking into the opening 81 depicted in FIG. 13.

FIG. 16 is a section view along section line 15 of FIG. 15.

DETAILED DESCRIPTION OF THE FIGURES

Figure 1:
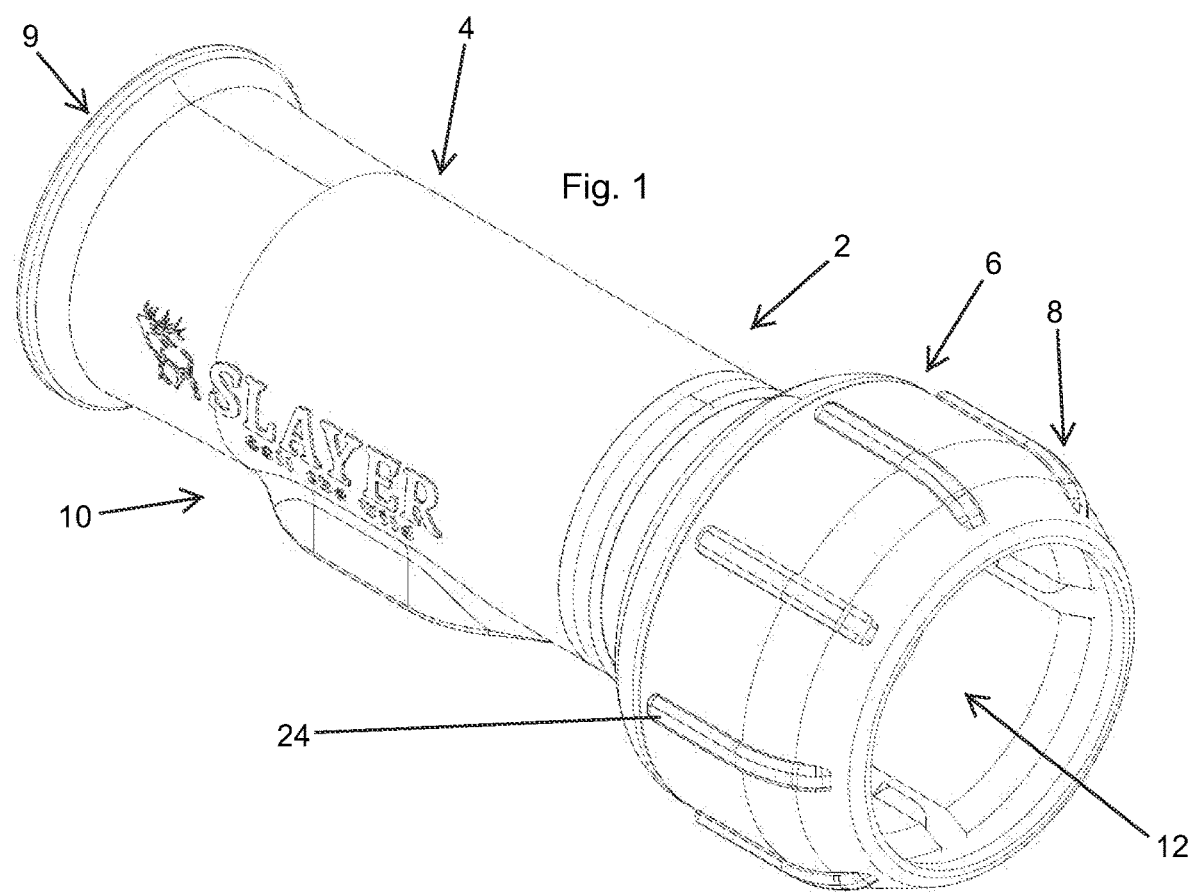
FIG. 1 is a perspective view of a preferred embodiment of an external reed call.

While the presently disclosed technology is susceptible of various modifications and alternative constructions, certain illustrated embodiments thereof have been shown in the drawings and will be described below in detail. It should be understood, however, that there is no intention to limit the claimed technology to the specific form disclosed, but, on the contrary, the presently disclosed and claimed technology is to cover all modifications, alternative constructions, and equivalents falling within the spirit and scope of the inventive concept(s) as defined in the claims. The use of the terms "upper" and "lower", "font" and "back," or "top" or "bottom" refer to the orientation shown in the figures and are not to be construed as limiting in the event of rotation of a device.

FIG. 1 illustrates a perspective view of an external reed call. The housing has an intake orifice 8 and output orifice 12. A user blows in the opening 9 and the air travels through the internal chamber (called a lumen) of the housing and across the reed (pictured in FIG. 1.1). The internal chamber (s) of the external reed call constrict airflow and force the airflow across the reed causing the elastomeric membrane of the reed to resonate. The sound is then emitted out the output orifice 12. The external reed call in the depicted embodiment has an actuator housing 4 connected to a reed housing 6. The reed housing has a compression ring 13 threadingly engaged to the end of the reed housing. The compression ring in the depicted embodiment is a threaded ring that attaches a bugle tube (shown in FIG. 24) to the mouthpiece.

A user positions the user's mouth against the end 8 of the mouthpiece and blows air into the call from the mouthpiece end 8 to the opening 12 at the end of the reed piece. The improved external reed call has an actuator 10 that is configured with an interior projection (16 in FIG. 6) referred to as an actuator tongue. The user depresses the actuator 10 causing the actuator tongue 16 to press against the reed 14. The actuator tongue 16 is configured with the shape, structure and geometry to simulate a human tongue positioned on the reed. In a preferred embodiment the actuator tongue is composed of silicone, preferably with a Shore hardness value of 2 A on the Shore hardness scale, to more accurately simulate a user's tongue.

In the depicted embodiment, the housing 2 is formed with two components. A reed support housing 6 and an actuator housing 4. The actuator housing comprises an actuator 10 that is configured to apply pressure to the reed by a projection extending into the internal chambers of the housing. The depicted embodiment utilizes a bugle tube attachment ring 8 that is threadingly attached to the end of the reed housing. The ring has finger grips 24 facilitating the attachment and detachment of the ring. The ring and reed housing are configured such that the end of a bugle tube is press fit with the ring and the end of the reed housing. As shown in FIG. 5, preferably the ring 6 and/or threaded end of the reed support housing 18, utilize a geometry having channels or other depressions 19 configured for placement of a lip of a bugle tube. The threaded rank can then be threaded onto the threaded end of the reed support housing affixing the bugle to the end of the bugle tube call.

FIG. 1.1 illustrates a partially exploded view showing the reed housing 6 exploded from the actuator housing 4. The exploded view of the reed housing illustrates the reed 17 positioned on the reed support frame 14. The reed is illustrated with the elastomeric membrane being a latex material 19 stretched between the opposing arms of the U-shaped metal reed frame 21. The reed holder is illustrated with reed 17 positioned on the red holder 14 and retained by the clip 15. The call can be configured to fixedly retain the reed, with the reed integral with the call, or alternatively with a removable reed to allow for different reeds configured for to produce varying sound for use in the call.

Figure 2:
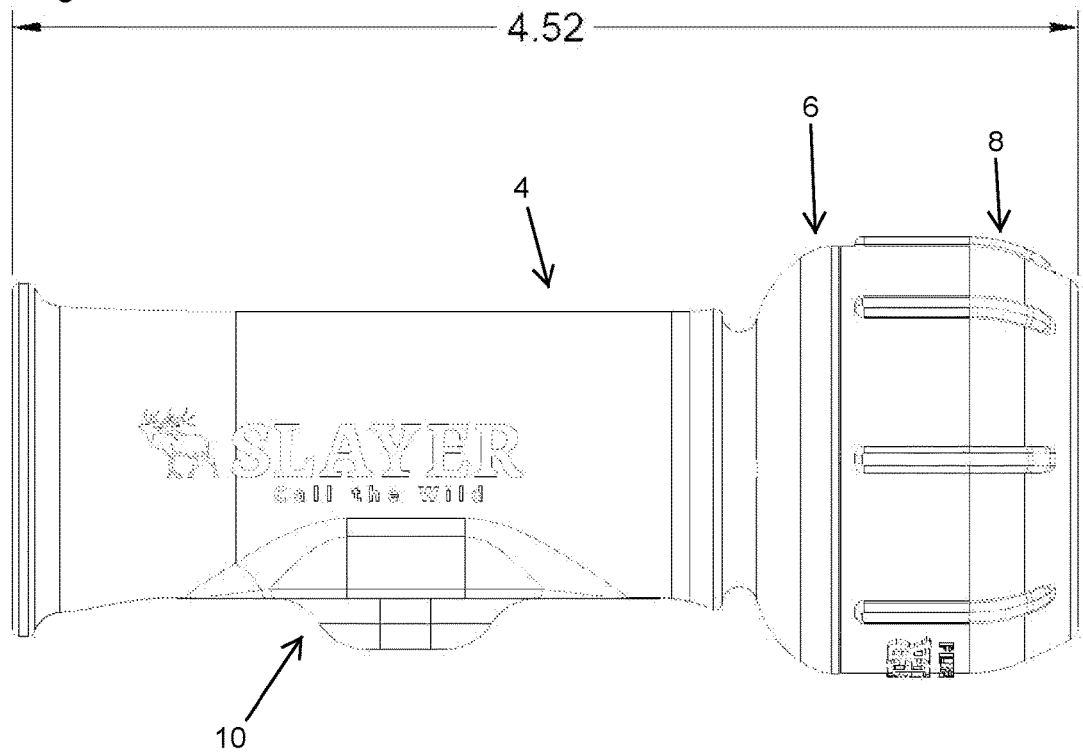
FIG. 2 is a side isometric view of the embodiment of an external reed call shown in FIG. 1.

FIG. 2 illustrates an isometric side view of the assembled external reed call 4. The actuator button 10 is shown in an underside of the call housing.

Figure 3:
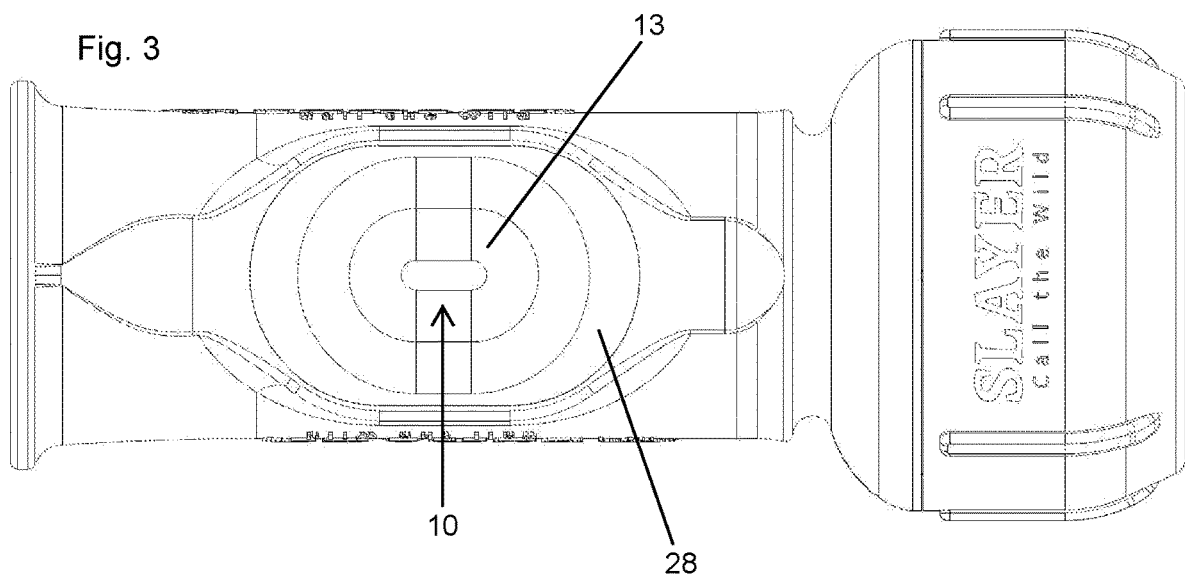
FIG. 3 is a top isometric view of the embodiment of an external reed call shown in FIG. 1.

FIG. 3 illustrates a bottom isometric view of the external reed call. The actuator 10 is shown positioned such that a user can depress the button 13 to move the internal actuator tongue towards the reed. In the depicted embodiment, the actuator is removable from the housing. That actuator is formed with a plate 28, configured to fit within the opening 11 (shown in FIGS. 13-14). The actuator button extends away from a bottom surface of the actuator plate. The actuator tongue extends in the opposite direction into the internal chamber of the external reed call. FIG. 4 illustrates a rear isometric view of the external reed call looking through the outflow orifice 12.

FIG. 5 illustrates a section view along line A of FIG. 4. FIG. 5 illustrates the internal assembly of the external reed call. The external reed call utilizes a reed support frame 14 extending from the reed support housing 6. The reed support frame 14 is configured to retain a reed in a reed support position 15.1. In use, a user blows air into the intake orifice 8. The air is constricted by the reed support frame and flows through channel 17 and across the reed, causing the reed to resonate and produce sound. The depression of the actuator button 13 causes the tongue actuator 16 to move toward and contact the reed restricting the restriction point 17. This restriction force on the reed coupled with the alteration of air flow across the reed causes the reed to emanate a different sound when airflow is blown across the reed. The sound waves and air enter the resonance chamber 21 amplifying the sound, which then travels out of orifice 12.

Figure 6:
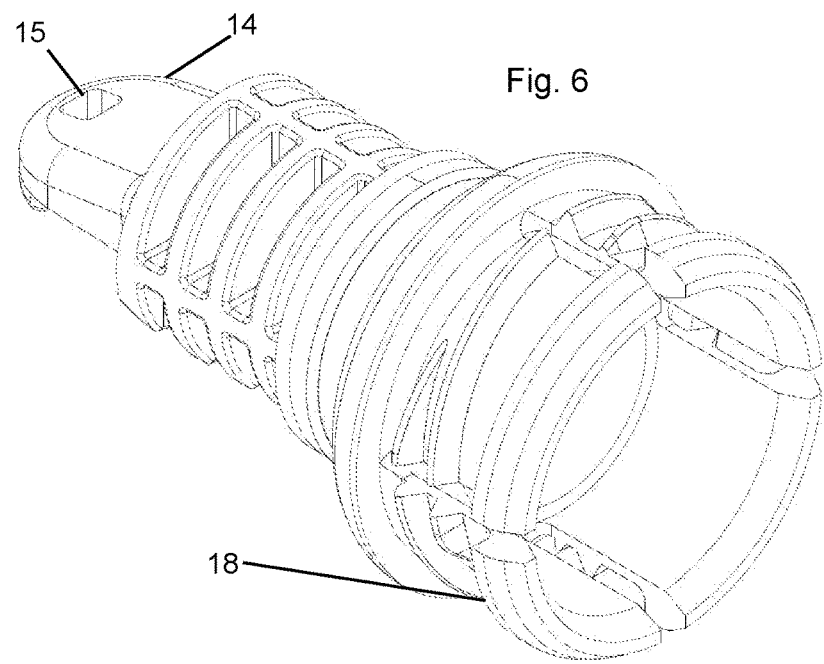
FIG. 6 is a perspective view of the reed support housing of the call shown in FIG. 1.
Figure 7:
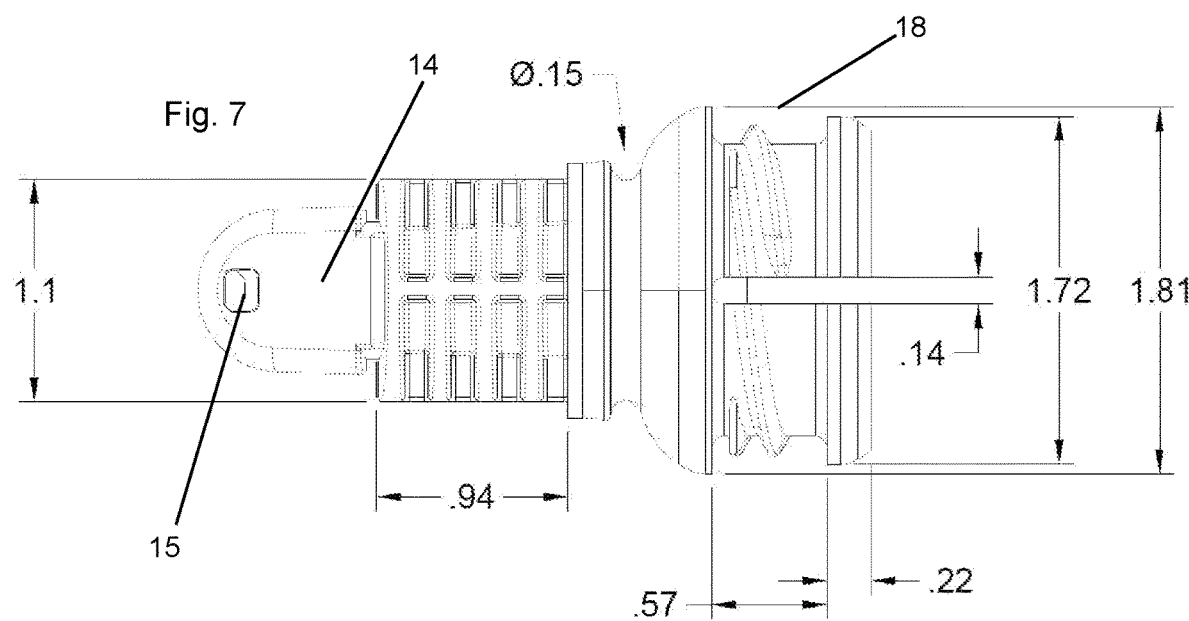
FIG. 7 is a bottom isometric view of the reed support housing of FIG. 6.
Figure 10:
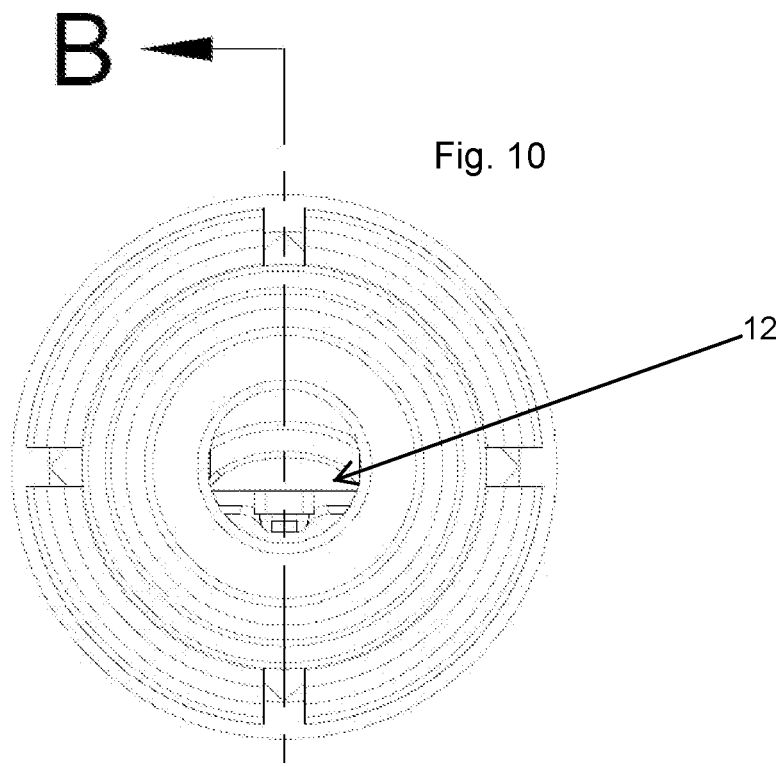
FIG. 10 is an isometric view looking into the reed support housing from the bugle attachment end having the threaded ring removed.
Figure 11:
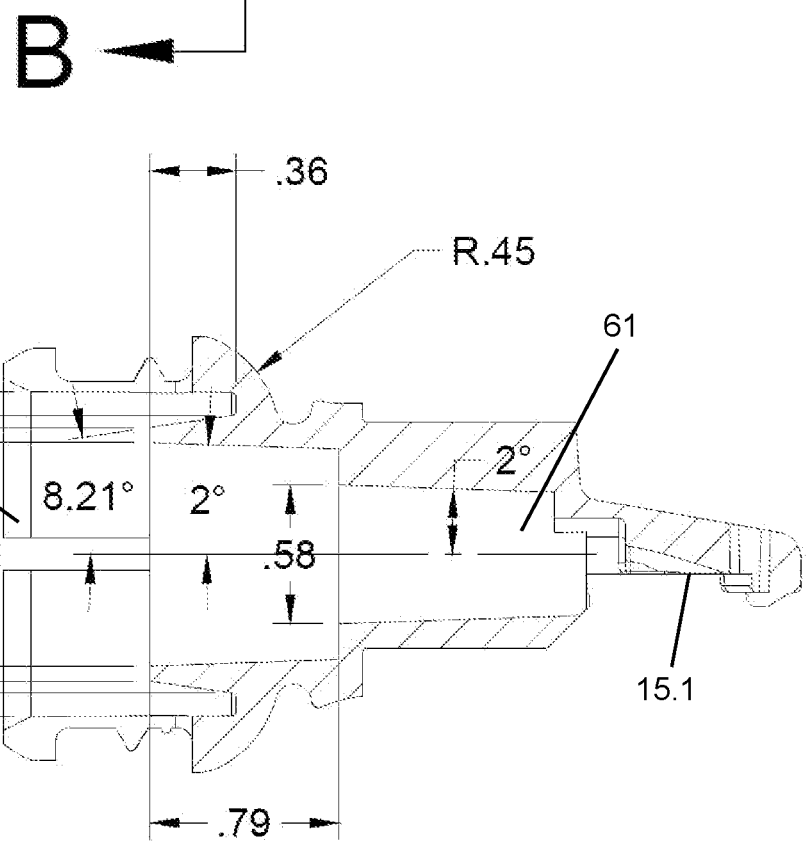
FIG. 11 is a section view of the reed support housing along section line B of FIG. 10.

FIG. 6 illustrates a perspective view of the reed support housing showing the top of the reed support frame. The reed support housing has reed support frame 14 extending away from the threaded end 18 of the reed support housing. Reed support frame 14 has a void 15 extending through the reed support frame. The void allows for air to travel beneath the reed and out through the reed support frame. FIG. 7 illustrates a top isometric view of the reed support housing illustrating the reed support frame 14 and void 15 through the reed support frame. FIG. 8 illustrates a side isometric view of the reed support housing. The reed support frame 14 extends away from the body 27 of the reed support frame. The body 27 of the reed support frame forms an air passage way for air passing over the reed and through chamber formed within the reed support housing body 27. A reed retention clip 18 is positioned on the underside of the reed support frame. The reed is retained at the reed retention position 15.1. FIG. 9 illustrates a bottom isometric view of the reed support housing including the reed support clip 18. The reed support clip can be configured with a resilient characteristic or alternately a press-in or alternative structure for affixing the reed to the reed support frame. FIG. 10 illustrates a view looking into the orifice 12 of the reed support frame. FIG. 11 illustrates a section view of reed support frame along section line B of FIG. 10. The internal chamber 61 of the reed support frame is illustrated. After air flows across the reed position 15.1, the air travels out of the internal chamber 61 of the body of the reed support frame and out the orifice 12.

Figure 12:
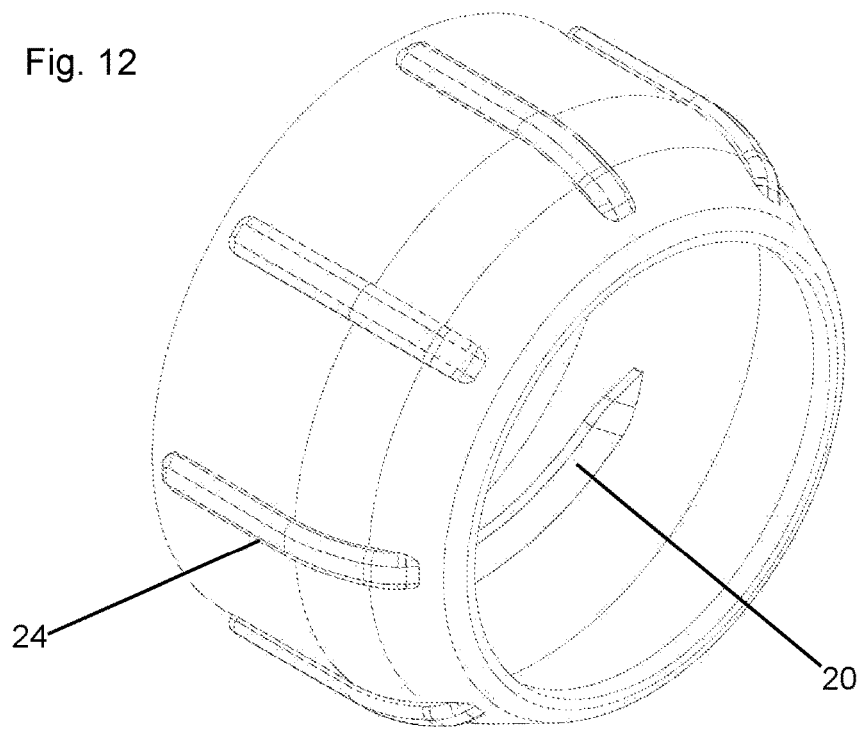
FIG. 12 is a perspective view of the threaded ring for attaching a bugle tube of FIG. 1.

FIG. 12 illustrates a perspective view of the ring configured for retaining a bugle tube on the end of the call. The ring has internal threads 20 that are configured for retaining a bugle tube at the end of the call. The ring has internal threads 20 that are configured for threaded engagement with the external rings of the reed support housing. Finger grips 24 are illustrated along the external circumference of the ring.

Figure 13:
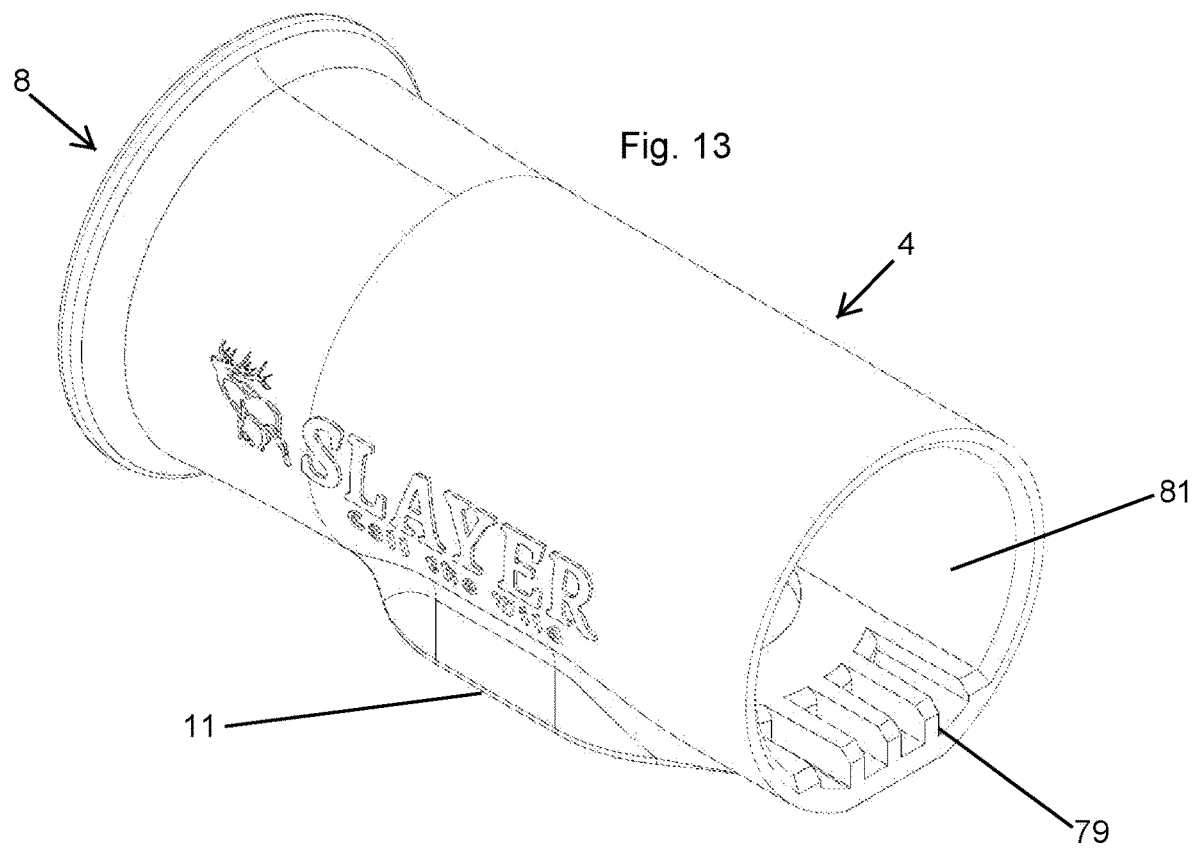
FIG. 13 is a perspective view of the actuator housing of FIG. 1.

FIG. 13 illustrates a perspective view of the actuator housing of the depicted embodiment. The actuator housing 4 is illustrated with the actuator removed illustrating actuator opening 11. The actuator is preferably removable from the housing but can be integral with the main housing or sub-housings. The actuator housing is configured with projections 79 configured for engagement with the corresponding projections of the reed support housing for alignment and engagement with the reed support housing. FIG. 13 illustrates the actuator removed from the actuator housing to illustrate the opening 11 for engagement with the actuator.

Figure 17:
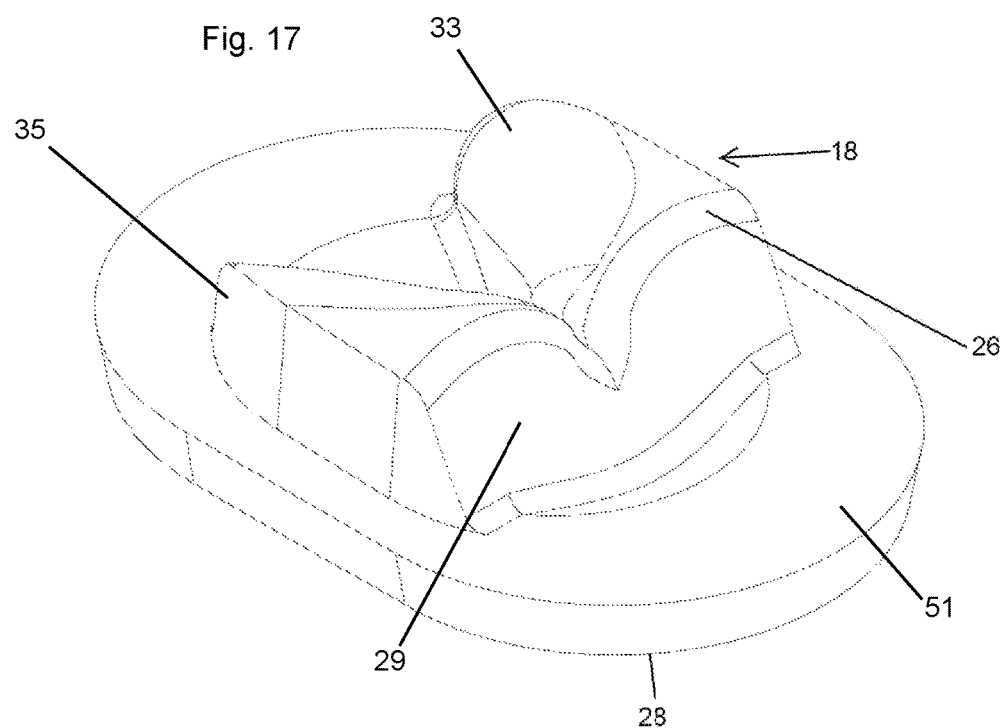
FIG. 17 is a perspective view of the actuator showing the actuator tongue and actuator disc.
Figure 19:
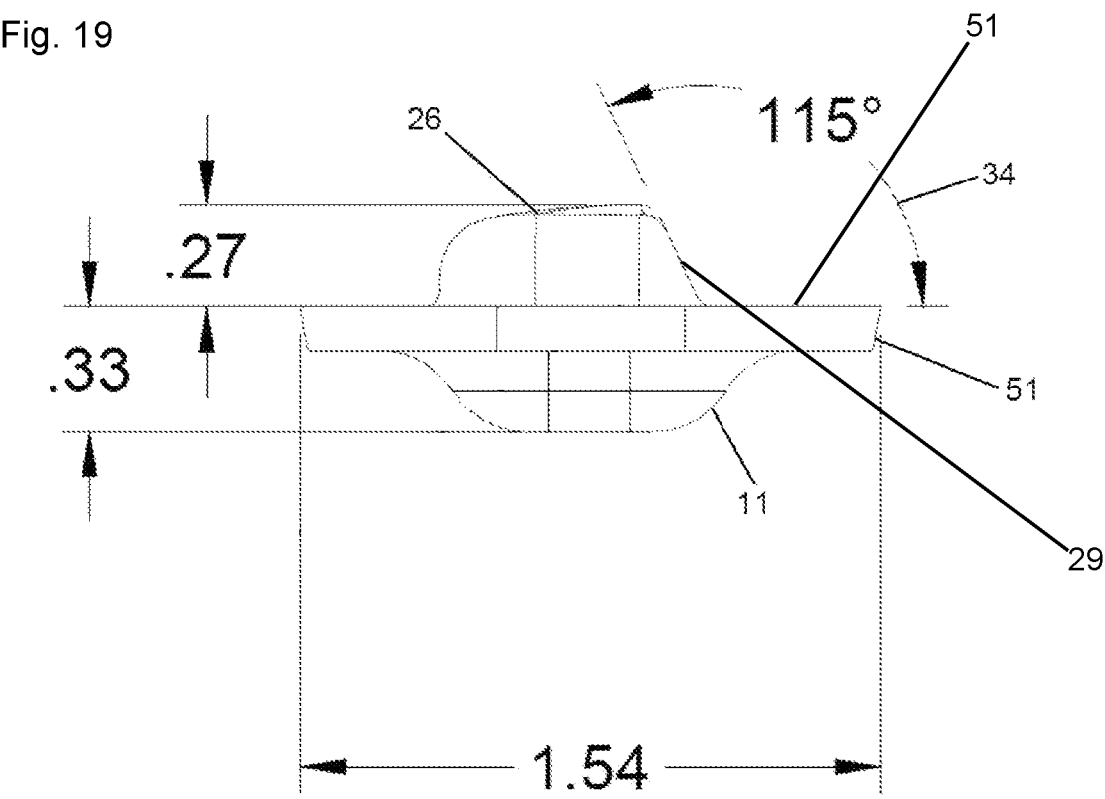
FIG. 19. is a side isometric view of the actuator.

FIG. 14 illustrates a bottom perspective view of the actuator housing. Opening 11 is provided for placement of the actuator. The opening is configured with a slight angle of four degrees along the edges to allow for improved retention of the actuator within the opening 11. FIG. 15 illustrates an isometric view looking into the opening 81 of FIG. 13. FIG. 16 illustrates a section view of the actuator housing along section line C of FIG. 15. FIG. 17 illustrates a top perspective view of the actuator. The actuator tongue is illustrated extending away from the top surface 51 of the actuator disk 28. The actuator disk forms a rigid frame around the actuator tongues such that a user depressing the actuator button on the opposite side of the disk causes the actuator tongue to move toward the reed and release or decrease the pressure on the actuator button causing the depressed actuator tongue to move away from the reed or decrease pressure on the reed. The actuator tongue is shown with two opposing lobes 33, 35 that extend from a front face 29 of the actuator tongue. The front face provides a bevel at approximately a one hundred fifteen degree (115) angle from the top surface of the actuator plate, as illustrated in FIG. 19.

Figure 18:
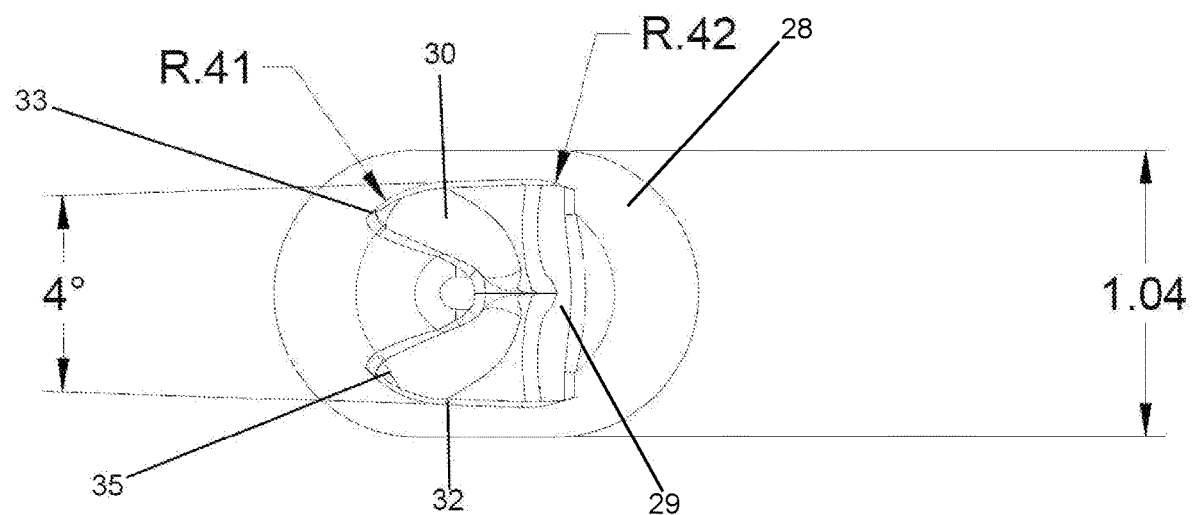
FIG. 18 is a bottom isometric view of the actuator showing the actuator tongue and actuator disc.

FIG. 18 illustrates a top isometric view of the actuator insert. The internal slope 30, 32 illustrated in FIG. 18 shows the gentle sloping of each lobe toward the meeting at the center of the tongue to simulate the opposing lingual papillae of the body of a user's tongue when used on an internal reed call. The depression in the center is configured to simulate the median lingual sulcus that divides the tongue in to the opposing lingual papillae. FIG. 19 illustrates a side perspective view of the actuator. The actuator button 11 extends from the lower side of the actuator ring. The actuator tongue 26 extends from the top surface of the actuator.

Figure 20:
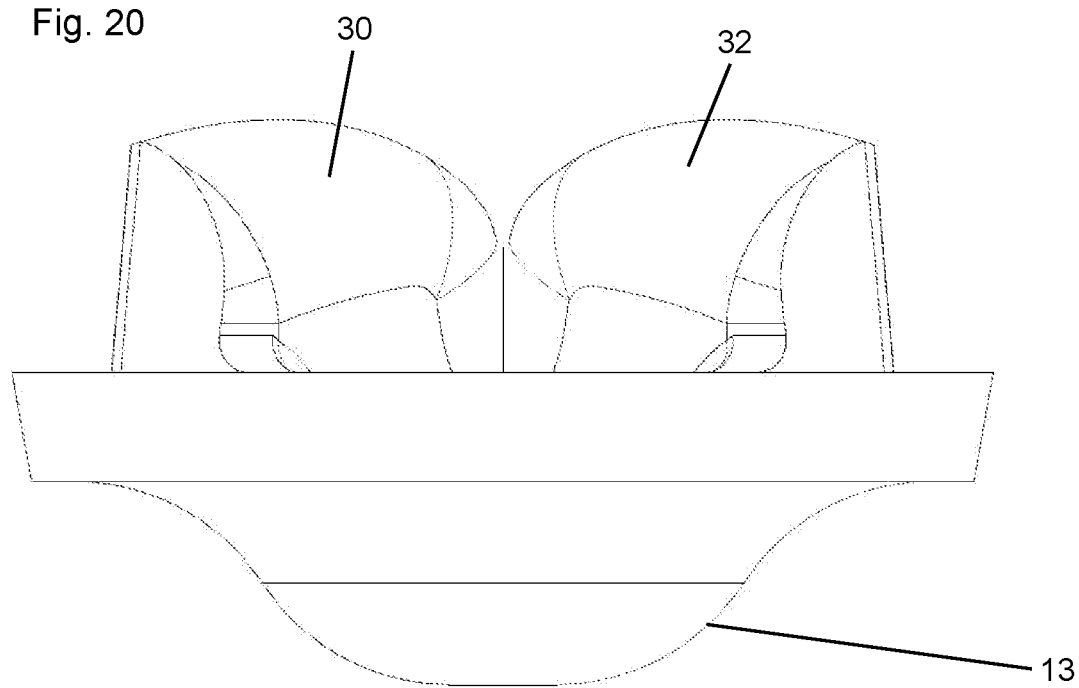
FIG. 20 is a front isometric view of the actuator.
Figure 21:
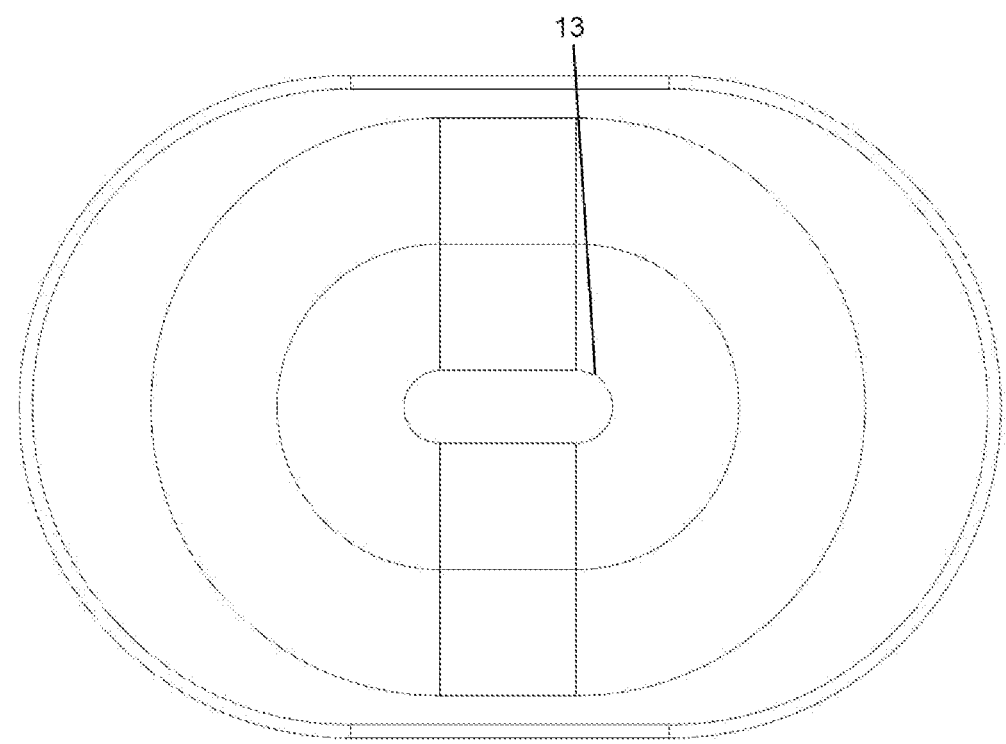
FIG. 21 is a top isometric view of the actuator showing the button and actuator plate.
Figure 22:
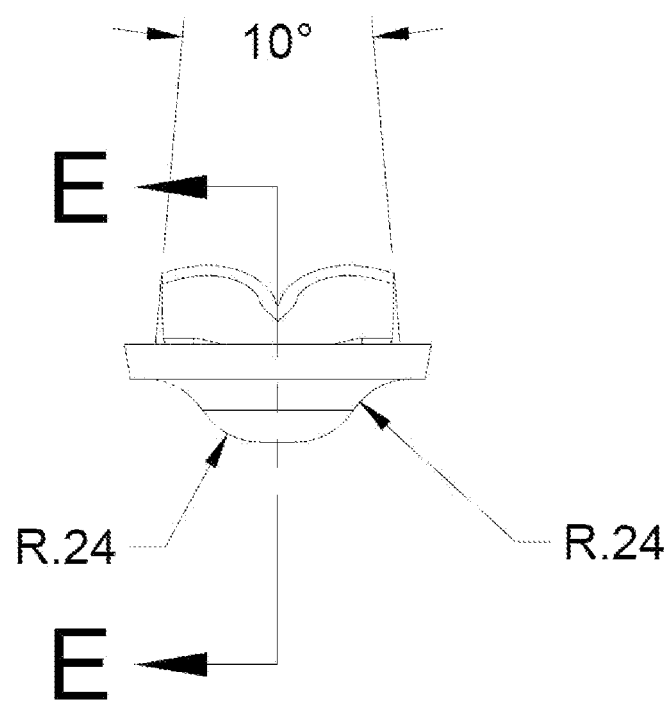
FIG. 22 is a back isometric view of the actuator.
Figure 23:
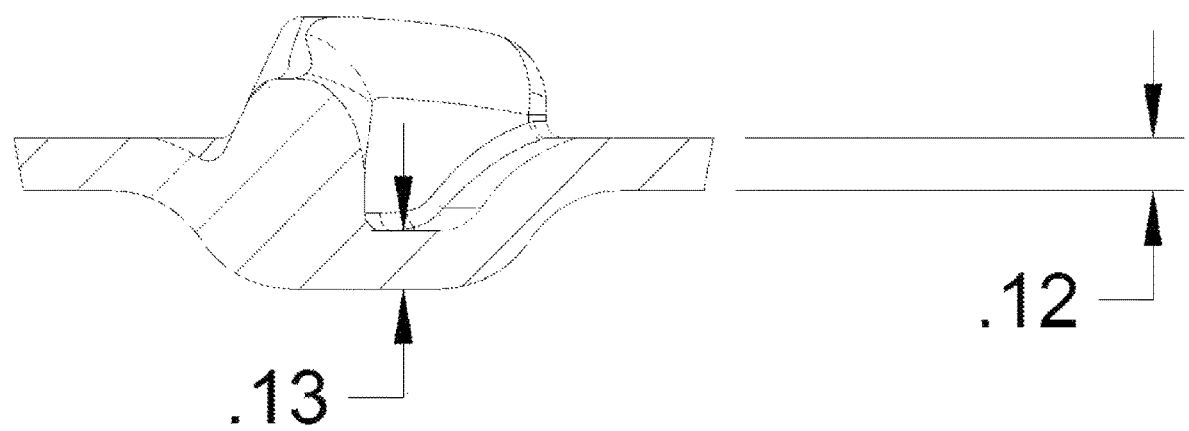
FIG. 23 is a section view of the actuator along section line E of FIG. 23.

FIG. 20 illustrates a rear view of a rear isometric view of the actuator. The slope being surfaces 30, 32 of the actuator tongue are illustrated. FIG. 13 illustrates a bottom view of the actuator illustrating button 13. FIG. 21 illustrates a front view of the actuator looking at the front of the button and the beveled front surface of the actuator tongue. FIG. 23 illustrates a section view along section line E of FIG. 22. The depression between the two lobes of the tongue actuator is illustrated as formed as extending beyond the ring frame of the actuator and into the actuator plate. The depth of the void or cleft is provided for air circulation as the user blows into the call. This mimics the lumen of the user's mouth.

Figure 24:
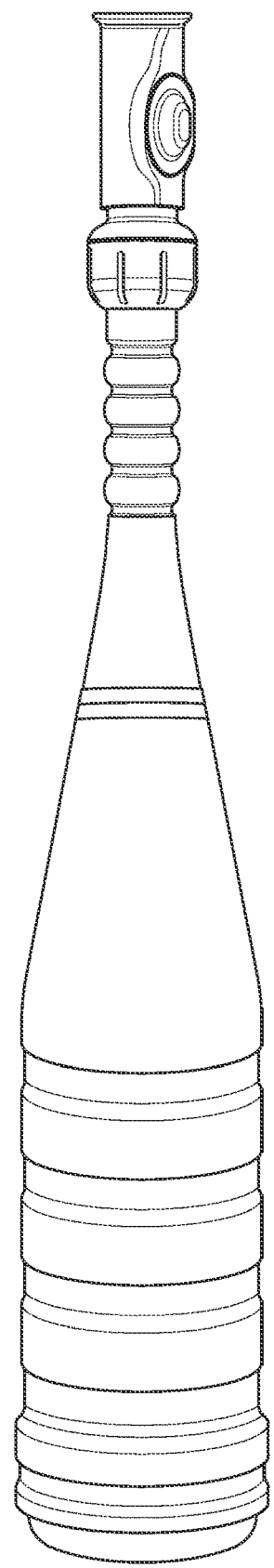
FIG. 24 is a perspective view of the improved call of FIG. 1 attached to a bugle tube.

FIG. 24 illustrates the external reed call 22 attached to a bugle tube 120. The bugle tube has a resonance chamber shown as the wider portion 122. The resonance chamber allows for the resonation and amplification of sound by the external reed call.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

The invention claimed is:

1. An external reed game call, said call comprising:
   a housing having a housing wall and defining an inflow orifice and an outflow orifice and configured for airflow in said inflow orifice and out said outflow orifice through a lumen of the housing defining an airflow path;
   a reed positioned in said housing between said inflow orifice and outflow orifice and configured to emit sounds to mimic a game animal as airflow passes over said reed, said reed having a first end and a second end, wherein said reed second end having an elastomeric membrane stretched between two arms of a reed frame, wherein said reed mounted in said lumen such that airflow from said inflow orifice flows across said reed from said first end of said reed toward said second end of said reed;
   an actuator extending through said housing wall and configured to apply pressure to said reed to alter the sounds emitted by said reed, wherein said actuator comprises a button positioned on an external side of said housing, wherein said actuator comprises an actuator tongue extending in an opposite direction from said actuator button into said lumen of said housing, wherein said actuator button is configured to move said actuator tongue into contact with said reed and to apply variable pressure to said reed as variable pressure is applied to said actuator button, wherein said actuator tongue comprises two lobes extending away from said button, wherein said lobes extending longitudinally in said lumen along said airflow path.

2. The external reed game call of claim 1, wherein said lobes extend parallel to each other.

3. The external reed game call of claim 1 wherein each of said lobes comprises a narrower end and a wider end.

4. The external reed game call of claim 1 wherein said reed is mounted on a reed support frame.

5. The external reed game call of claim 4 wherein said reed is removably mounted on said reed support frame.

6. The external game call of claim 4 wherein said reed support frame comprises a tab for retaining said reed.

7. The external game call of claim 4 wherein said reed support frame and said actuator housing are connected by interlocking projections.

8. The external reed game call of claim 1 wherein said housing comprises a reed support housing and an actuator housing, wherein said actuator housing defines said inflow orifice and comprises said actuator button, wherein said reed support housing comprises a reed support frame.

9. The external reed game call of claim 8 wherein said reed support housing is configured for attachment to a bugle tube.

10. The external game call of claim 9 wherein said reed support housing comprises a threaded ring configured for attaching said reed support housing to a bugle tube.

11. The external game call of claim 1 wherein said reed comprises a U-shape having a U-shaped frame with said elastomeric membrane stretched between the arms of the U-shape.

12. The external game call of claim 1 wherein said elastomeric membrane comprises latex.

13. The external game call of claim 1 wherein said actuator comprises an actuator disc positioned within an opening in said actuator housing, wherein said button extends from a top surface of said actuator disc, wherein said actuator tongue extends from a bottom surface of said actuator disc.

14. The external game call of claim 1 wherein said lobes comprise are tapered in height between said first end and said second end.

15. The external game call of claim 1 wherein said crevice is wider at a first end of said actuator tongue than at a second end of said actuator tongue.

16. The external game call of claim 1 wherein said lobes taper in height from an outer portion toward said crevice.

17. The external game call of claim 1 wherein said button protrudes from said disc.

* * * * *